United States Patent
Slaby et al.

(10) Patent No.: US 12,472,303 B2
(45) Date of Patent: Nov. 18, 2025

(54) RACK-PUMP CHARGING PRIORITIZATION IN MULTI-PUMP ASSEMBLY

(71) Applicants: Baxter International Inc., Deerfield, IL (US); Baxter Healthcare SA, Glattpark (CH)

(72) Inventors: Jiri Slaby, Buffalo Grove, IL (US); Peter Bojan, Grayslake, IL (US); Aaron Hexamer, Grayslake, IL (US)

(73) Assignees: Baxter International Inc., Deerfield, IL (US); Baxter Healthcare SA, Glattpark (CH)

(*) Notice: Subject to any disclaimer, the term of this patent is extended or adjusted under 35 U.S.C. 154(b) by 649 days.

(21) Appl. No.: 17/954,897

(22) Filed: Sep. 28, 2022

(65) Prior Publication Data

US 2023/0102848 A1 Mar. 30, 2023

Related U.S. Application Data

(60) Provisional application No. 63/249,259, filed on Sep. 28, 2021.

(51) Int. Cl.
*A61M 5/00* (2006.01)
*A61M 5/14* (2006.01)
*A61M 5/142* (2006.01)

(52) U.S. Cl.
CPC .......... *A61M 5/008* (2013.01); *A61M 5/1408* (2013.01); *A61M 5/142* (2013.01); *A61M 2205/8237* (2013.01)

(58) Field of Classification Search
CPC ................ A61M 5/008; A61M 5/1408; A61M 2205/8237; A61M 2205/3368; A61M 2205/50; G16H 20/17; G16H 40/60; G16H 40/40
See application file for complete search history.

(56) References Cited

U.S. PATENT DOCUMENTS

| 6,369,642 B1* | 4/2002 | Zeng | H02M 3/073 |
| | | | 327/536 |
| 2015/0157791 A1* | 6/2015 | Desch | G16H 40/67 |
| | | | 702/50 |
| 2015/0196709 A1* | 7/2015 | Jacobson | A61M 5/142 |
| | | | 604/67 |

\* cited by examiner

*Primary Examiner* — Nicholas Klicos
(74) *Attorney, Agent, or Firm* — K&L Gates LLP

(57) ABSTRACT

The present disclosure provides a new and innovative method for dynamically managing power and charging rates of multi-pump assemblies. In various embodiments, a computer-implemented method includes monitoring a plurality of pump parameters for a plurality of infusion pumps, assessing a change in the parameter states, establishing charging needs for each infusion pump in the plurality of infusion pumps, and establishing a charging profile for each infusion pump in the plurality of infusion pumps.

19 Claims, 5 Drawing Sheets

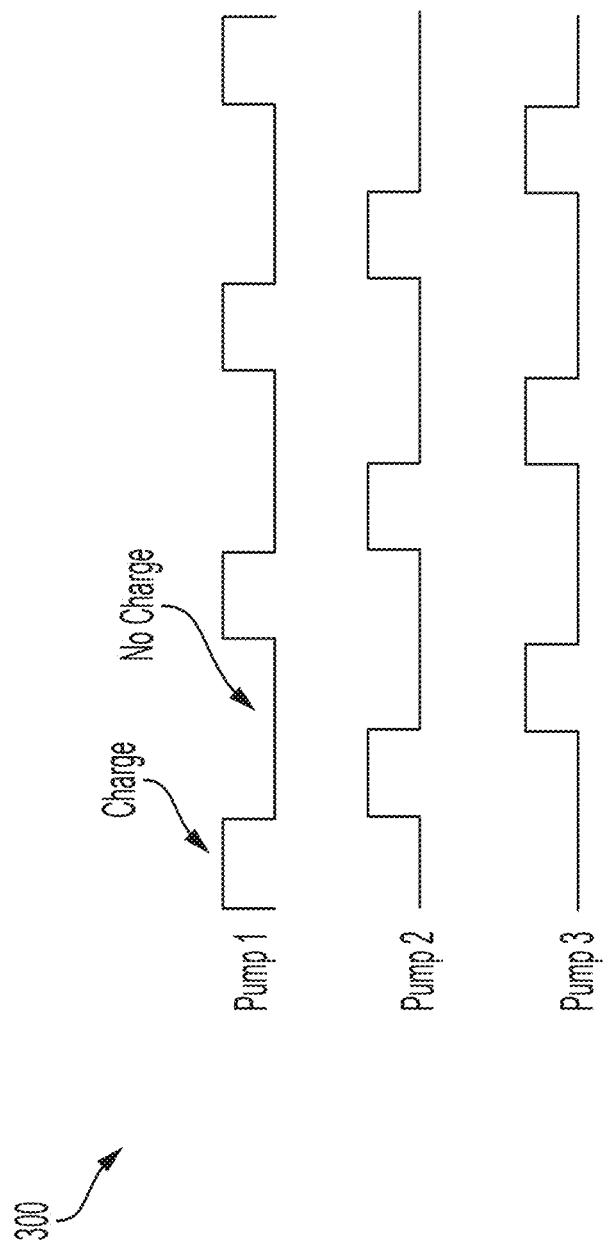

RACK-PUMP CHARGING PRIORITIZATION IN MULTI-PUMP ASSEMBLY

PRIORITY CLAIM

This application claims priority to and the benefit as a non-provisional application of U.S. Provisional Patent Application No. 63/249,259, filed Sep. 28, 2021, the entire contents of which are hereby incorporated by reference and relied upon.

TECHNICAL FIELD

The instant application is directed towards electronic devices, and more specifically to control systems for managing power and charging rates in a multi-pump assembly.

BACKGROUND

The present disclosure provides new and innovative methods for the management of power and charging rates of a plurality of pumps within an infusion pump rack. Generally, medical patients sometimes require precise delivery of either continuous medication or medication at set periodic intervals. Medical pumps provide controlled drug infusion such that a drug can be administered at a precise rate that keeps the drug concentration within a therapeutic margin and out of an unnecessary or possibly toxic range. The medical pumps can provide appropriate drug delivery to a patient at a controllable rate, which does not require frequent attention.

Medical pumps may facilitate the administration of intravenous (IV) therapy to patients both in and outside of a clinical setting. Outside a clinical setting, doctors have found that in many instances patients can return to substantially normal lives, provided they receive periodic or continuous intravenous administration of medication. Among the types of therapies requiring this kind of administration are antibiotic therapy, chemotherapy, pain control therapy, nutritional therapy, and several other types known by those skilled in the art. In many cases, patients receive multiple daily therapies. Certain medical conditions require the infusion of drugs in solution over relatively short periods of time, such as from thirty minutes to two hours. These conditions and others have combined to promote the development of increasingly lightweight, portable, or ambulatory infusion pumps that can be worn by a patient and are capable of administering a continuous supply of medication at a desired rate, or providing several doses of medication at scheduled intervals.

Configurations of infusion pumps include elastomeric pumps, which squeeze a solution from flexible containers, such as balloons, into IV tubing for delivery to a patient. Alternatively, spring-loaded pumps pressurize solution containers or reservoirs. Certain pump designs use cartridges containing flexible compartments that are squeezed by pressure rollers for discharging the solutions. Infusion pumps using syringes are also known. These syringe pumps include a drive mechanism that moves a plunger of a syringe to deliver fluid to a patient. Typically, these infusion pumps include a housing adapted to receive a syringe assembly, a drive mechanism adapted to move the syringe plunger, a pump control unit having a variety of operating controls, and a power source for powering the pump including the drive mechanism and controls.

Charge management of these medical devices is becoming increasingly important as patients may require multiple infusion medications, which all consume power at different rates. Charging multiple pumps within a rack is typically associated with a higher power draw, and the power draw of a pump is related to the rate of infusions administered. The frequency of infusions often differs from pump to pump, so dynamically managing the charging rates of each can lead to a more efficient multi-pump assembly. A failure to manage charging rates of infusion pumps can lead to complications for patients.

Several methods exist to ensure batteries within an infusion pump remain charged. However, these methods particularly focus on ensuring that batteries stored in pump systems are not damaged by excessive temperature. These existing methods have several disadvantages. For example, one existing method for ensuring a battery pack stored in a system is not damaged by excessive temperature is to use fans or other active cooling devices to manage the thermal performance. These methods, however, have a variety of limitations and drawbacks. For example, active cooling devices increase the overall cost of the system and increase power demand as the active cooling devices require power. This can be particularly problematic for battery-powered devices that already have a fixed amount of power for the device. Active cooling devices may also have life limitations that are shorter than the overall life of the medical device, requiring repair and/or premature replacement of the medical device.

In addition to ensuring batteries within a pump do not deplete from thermal restrictions, a dynamic management system can diminish potential risk to a patient. Accordingly, a method for dynamically managing the power and charging rate of a plurality of pumps within an infusion pump rack is desired.

SUMMARY

The present disclosure provides a new and innovative system and method for dynamically managing power and charging rates of multi-pump assemblies. The system and method described herein improve the ability of the pumps to maintain the power levels necessary to ensure that each pump remains in operation and improves its useful lifespan. The system and method described herein also ensure a charging capacity of a pump rack is maintained while ensuring each pump is sufficiently charged.

In light of the disclosure set forth herein, and without limiting the disclosure in any way, in a first aspect of the present disclosure, which may be combined with any other aspect, or portion thereof, described herein an infusion pump system includes a first infusion pump, a second infusion pump, and a rack configured to mechanically couple to the first infusion pump and the second infusion pump. The rack includes a management system that is communicatively coupled to the first infusion pump and the second infusion pump via a communication bus. The management system is configured to monitor a plurality of pump parameters for the first and second infusion pumps, determine charging needs for each infusion pump using the plurality of pump parameters, and create a first charging profile for the first infusion pump and a different, second charging profile for the second infusion pump using the determined charging needs. The management system is also configured to transmit at least one command to each infusion pump that is indicative of the respective charging profile. The first infusion pump is configured to charge according to the first charging profile and the second infusion is configured to charge according to the second charging profile.

In a second aspect of the present disclosure, which may be combined with any other aspect, or portion thereof, described herein the pump parameters comprise at least one of a criticality determination of a patient's medication, a battery charge state, a thermal state, or a power supply state.

In a third aspect of the present disclosure, which may be combined with any other aspect, or portion thereof, described herein the management system is further configured to determine a pump schedule for the first and second infusion pumps using the plurality of pump parameters, and determine the charging needs for each infusion pump using the pump schedule.

In a fourth aspect of the present disclosure, which may be combined with any other aspect, or portion thereof, described herein the management system is further configured to determine the first charging profile and the second charging profile such that the first infusion pump and the second infusion pump are charged at different times.

In a fifth aspect of the present disclosure, which may be combined with any other aspect, or portion thereof, described herein the management system is further configured to determine the first charging profile and the second charging profile such that the first infusion pump and the second infusion pump are charged at overlapping times.

In a sixth aspect of the present disclosure, which may be combined with any other aspect, or portion thereof, described herein the management system is further configured to determine the pump schedule based on pumping frequencies or infusion rates of the first infusion pump and the second infusion pump.

In a seventh aspect of the present disclosure, which may be combined with any other aspect, or portion thereof, described herein the first charging profile specifies times the first infusion pump is to enter a charge state and times the first infusion pump is to enter a no charge state, and the second charging profile specifies times the second infusion pump is to enter a charge state and times the second infusion pump is to enter a no charge state.

In an eighth aspect of the present disclosure, which may be combined with any other aspect, or portion thereof, described herein the management system is further configured to use the first charging profile to determine transitions between the no charge state and the charge state for the first infusion pump, and transmit the commands to cause the first infusion pump to change its charge state based on the determined transitions.

In a ninth aspect of the present disclosure, which may be combined with any other aspect, or portion thereof, described herein the management system is further configured to use the second charging profile to determine transitions between the no charge state and the charge state for the second infusion pump, and transmit the commands to cause the second infusion pump to change its charge state based on the determined transitions.

In a tenth aspect of the present disclosure, which may be combined with any other aspect, or portion thereof, described herein the management system receives the plurality of pump parameters at a first time and receives a second plurality of pump parameters at a second, subsequent time. Additionally, the management system is configured to determine a change in the pump parameters based on a difference between the plurality of pump parameters received at the first time and the second the plurality of pump parameters received at the second time, determine new charging needs for each infusion pump, create a new first charging profile for the first infusion pump and a different, new second charging profile for the second infusion pump, and transmit at least one new command to each infusion pump that is indicative of the respective new charging profile.

In an eleventh aspect of the present disclosure, which may be combined with any other aspect, or portion thereof, described herein the system further includes a third infusion pump mechanically coupled to the rack and communicatively coupled to the management system. The management system is further configured to monitor the plurality of pump parameters additionally for the third infusion pump, determine charging needs additionally for the third infusion pump, create a third charging profile for the third infusion pump using the determined charging needs, and transmit at least one command to the third infusion pump that is indicative of the third charging profile.

In a twelfth aspect of the present disclosure, which may be combined with any other aspect, or portion thereof, described herein the first infusion pump is at least one of a large volume pump, a syringe pump, a patient-controlled analgesia pump, or a nutrition pump, and the second infusion pump is at least one of a large volume pump, a syringe pump, a patient-controlled analgesia pump, or a nutrition pump.

In a thirteenth aspect of the present disclosure, which may be combined with any other aspect, or portion thereof, described herein the management system is further configured to transmit a request message to the first and second infusion pumps to receive the plurality of pump parameters.

In a fourteenth aspect of the present disclosure, which may be combined with any other aspect, or portion thereof, described herein the management system is communicatively coupled to the first infusion pump and the second infusion pump via at least one of a serial connection, a controller area network ("CAN") connection, an Ethernet connection, or a universal serial bus ("USB") connection.

In a fifteenth aspect of the present disclosure, which may be combined with any other aspect, or portion thereof, described herein a computer-implemented method includes monitoring a plurality of pump parameters for a plurality of infusion pumps, assessing a change in the parameter states, establishing charging needs for each infusion pump in the plurality of infusion pumps, and establishing a charging profile for each infusion pump in the plurality of infusion pumps.

In a sixteenth aspect of the present disclosure, which may be combined with any other aspect, or portion thereof, described herein the pump parameters comprise at least a criticality determination of a patient's medication.

In a seventeenth aspect of the present disclosure, which may be combined with any other aspect, or portion thereof, described herein the pump parameters comprise at least a battery charge state.

In an eighteenth aspect of the present disclosure, which may be combined with any other aspect, or portion thereof, described herein the pump parameters comprise at least a pump schedule.

In a nineteenth aspect of the present disclosure, which may be combined with any other aspect, or portion thereof, described herein the pump parameters comprise at least a thermal state.

In a twentieth aspect of the present disclosure, which may be combined with any other aspect, or portion thereof, described herein the pump parameters comprise at least a power supply state.

In a twenty-first aspect, any of the features, functionality and alternatives described in connection with any one or more of FIGS. 1 to 4 may be combined with any of the features, functionality and alternatives described in connection with any other of FIGS. 1 to 4.

In light of the present disclosure and the above aspects, it is therefore an advantage of the present disclosure to provide for the management of a charging rate of a plurality of pumps within an infusion pump rack.

It is another advantage of the present disclosure to provide infusion pump charging in a rack to ensure a charging capacity or power rating of the rack is not exceeded.

Additional features and advantages of the disclosed method are described in, and will be apparent from, the following Detailed Description and the Drawings. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The description will be more fully understood with reference to the following figures, which are presented as exemplary aspects of the disclosure and should not be construed as a complete recitation of the scope of the disclosure.

FIGS. 3A and 3B illustrate examples of charging profiles, according to example aspects of the present disclosure.

DETAILED DESCRIPTION

Turning now to the drawings, techniques are disclosed for new and innovative methods for the management of a charging rate of a plurality of pumps within an infusion pump rack. The charge management of medical devices is becoming increasingly important as patients can require multiple infusion medications, which all consume power at different rates. For example, hospitals with patients requiring multiple infusion medications typically assemble infusion pumps into racks or use individual pumps on a pole to maximize pole utilizations and working convenience. Charging multiple pumps within a rack is typically associated with a higher power draw, and the power draw of a pump is related to the amount of infusions administered. For example, the pumps in a multi-pump assembly may need to limit charging under unique conditions at high ambient temperatures due to battery charging temperature limitations. For example, pumps employed in burn units may operate in environments around 32-35° C. This may create complications in patient critical emergencies. The frequency of infusions often differs from pump to pump, so dynamically managing the charging rates of each can lead to a more efficient multi-pump assembly.

Systems and methods as described herein are configured to control charging activity for both time and temperature parameters for multiple pumps in a rack. In particular, the charging of different devices can be controlled to keep each device within a particular thermal threshold, as described herein. The temperature can be monitored via several thermistors (or any other temperature sensing device) within the devices and/or rack. Accordingly, the systems and methods described herein improve the ability of the pumps to maintain the power levels necessary to ensure that each pump remains in operation and improves its useful lifespan. Further, the operation of pumps is improved by diminishing risks to users and patients due to a lower touch temperature of the device. The reliability of the devices is improved due to lower operating temperatures, thereby reducing wear and tear on internal components.

A variety of systems and processes in accordance with aspects of the disclosure are described in more detail below.

Figure 1:
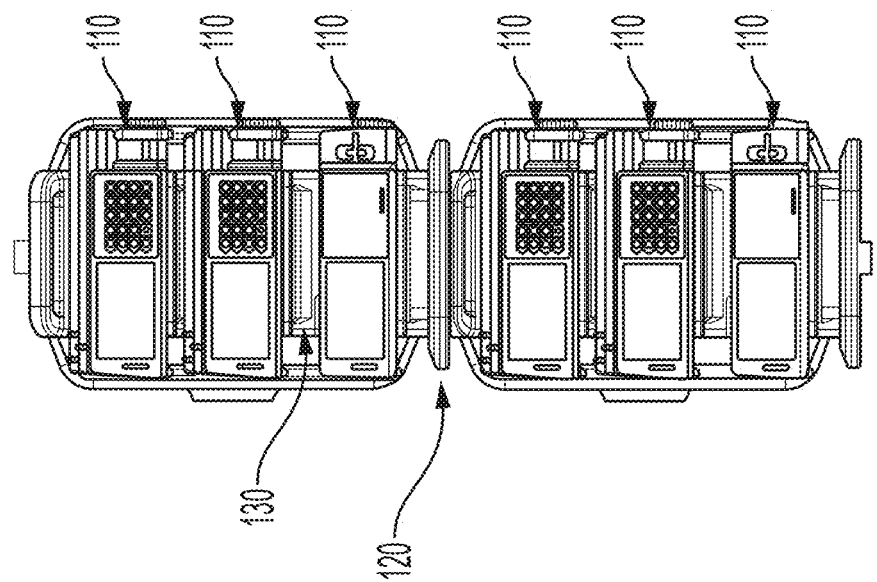
FIG. 1 illustrates an infusion pump rack containing a plurality of pumps, according to an example aspect of the present disclosure.

FIG. 1 illustrates an assembly that includes a plurality of infusion pumps 110. The multi-pump assembly can include a rack 120 with a plastic support and a metal pole clamp. The rack 120 may include a management system 130 for dynamically managing power and charging rates for the pumps 110. Each pump 110 may administer a different medication at a different interval than all other pumps within the system. For this reason, each pump 110 may have different charging needs. In a variety of embodiments, the assembly may include one or more active cooling devices, such as fans.

The pumps 110 may each include a large volume pump, a syringe pump, a patient-controlled analgesia pump, or a nutrition pump. In some embodiments, the charging needs are determined based on a type of pump. For example, a large volume pump may operate near-continuously and require charging priority compared to a patient-controlled analgesia pump, which is operated less frequently, especially after a bolus limit has been reached.

The management system 130 may include a processor that is communicatively coupled to a processor of each pump 110. In some embodiments, the rack 120 includes one or more communication buses that communicatively couple the pumps 110 and the management system 130 to each other. The communication bus may include a serial connection, a controller area network ("CAN") connection, an Ethernet connection, or a universal serial bus ("USB") connection.

The management system 130 may also include a memory device storing instructions, which when executed by the processor, cause the management system 130 to perform the operations discussed herein. The management system 130 may establish a communication connection as each pump 110 is added to the rack 120. The management system 130 is configured to transmit a parameter request message to receive parameters from each pump 110. Further, the management system 130 is configured to transmit command messages to the pumps 110 with information (e.g., a charging profile) that causes each pump to set a specified charge rate or state. The management system 130 may determine a different charge rate or state for each pump 110. The management system 130 accordingly provides for an allocation of rack power to each pump 110.

Systems and methods in accordance with embodiments of the disclosure can dynamically manage power and charging rates in multi-pump assemblies (e.g. racks and pump-on-pump configurations) based on criticality of pump medication delivery by prioritizing charging based on the pumps output and other parameters. The parameters can include, but are not limited to, medication, thermal performance, power supply state, battery capacity state, and the like. By dynamically managing the power and charging rate, the systems and methods can minimize rack power requirements and improve thermal performance.

Figure 2:
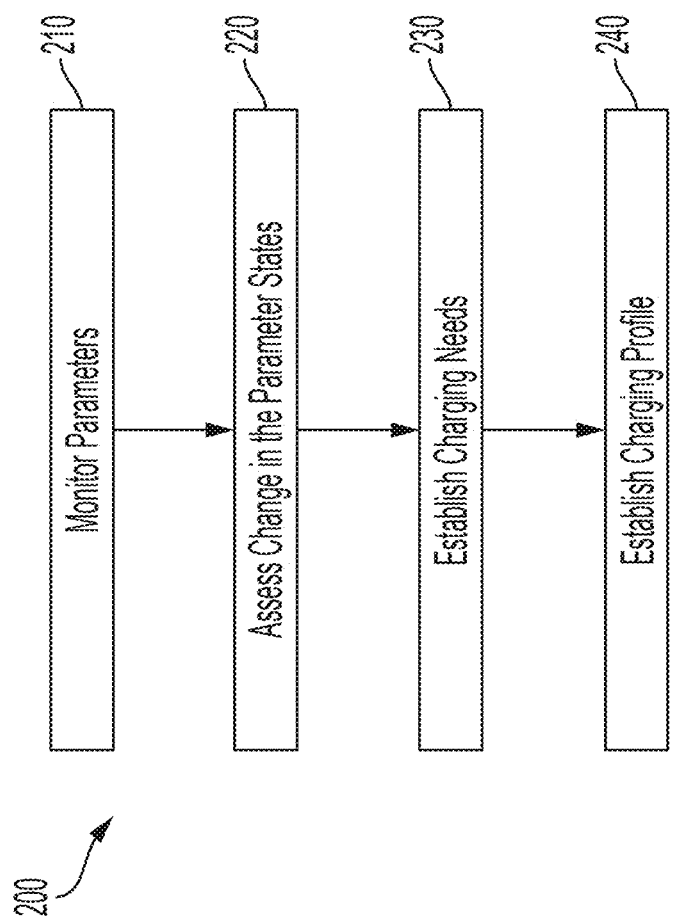
FIG. 2 illustrates a flowchart of a process for determining charging rates in a plurality of infusion pumps, according to an example aspect of the present disclosure.

FIG. 2 illustrates a flow chart of a process for determining charging rates in a plurality of infusion pumps, according to an example aspect of the present disclosure. Although the process 200 is described with reference to the flowchart illustrated in FIG. 2, it should be appreciated that many other methods of performing the acts associated with the process 200 may be used. For example, the order of some of the blocks may be changed, certain blocks may be combined with other blocks, one or more blocks may be repeated, and some of the blocks described are optional.

The process 200 begins when parameters of the pumps 110 are monitored (210). In several embodiments, a parameter to be monitored (210) may include a criticality of a patient's medication. For example, if a patient is receiving a critical medication along with a noncritical medication, the management system 130 that assesses for criticality can ensure that the pump administering critical medication is charged in a timely manner. As discussed above, the management system 130 may be provided within the rack 120. Alternatively, the management system 130 may instead be deployed within at least one of the pumps 110. Further, the management system 130 may be external to the rack 120 and the pumps 110. In this instance, the management system 130 may be located at an external server.

In several embodiments, a parameter to be monitored (210) may include a pump's battery charge state. For example, if a battery to an infusion pump is at a low power level, the power management system 130 may prioritize charging to that pump. This would allow for fewer pumps to have depleted batteries, which would diminish the risk to a patient receiving medication. In several embodiments, a parameter to be monitored (210) may include a pump schedule. Because medications require different dosages, different pumps may require different infusion schedules. For example, if a pump within the rack 120 is scheduled to administer medication more frequently than all other pumps within the rack, that particular pump may receive priority in charging. In several embodiments, a parameter to be monitored (210) may include a pump's thermal state. This may occur in situations where pumps 110 may need to limit charging under unique conditions at high ambient temperatures due to a battery charging temperature limitation.

In some embodiments, the management system 130 requests infusion parameters from each of the connected pumps 110. The infusion parameters may specify an infusion schedule or an infusion rate. The management system 130 is configured to create a complete infusion schedule of the pumps 110 connected to the rack 120 to estimate charging needs.

Dynamically managing charging rates enables an allocation of rack power to each pump such that the pump's battery can be charged to a level that reduces risk to the patient from a depleted battery. In several embodiments, a parameter to be monitored (210) may include a power supply state. The power supply state refers to the method in which the multi-pump assembly is being powered. For example, a power supply state could include being plugged into an outlet or connected to external charging system, either directly or via a wireless power connection. Depending on the conditions of the multi-pump assembly, the power supply may or may not be capable of reaching the maximum charging rate a pump is capable of receiving. The dynamic power management system 130 may be able to acknowledge a current state in order to assess charging priority.

Changes in the parameter states can be assessed (220) by the management system 130. Changes in the monitor states can include any of a variety of changes depending on the particular parameters being monitored. In several embodiments, the flow rate of medication can be monitored. In a variety of embodiments, the changes in the parameters include changes in thermal performance (e.g. temperature above or below a thermal threshold), power supply state (e.g. drawing current above or below a threshold value), battery capacity state (e.g. charge above or below a threshold value), and the like. For example, the amount of power that a pump is using can be based on a variety of functions including, but not limited to, battery charging, powering a pumping device to dispense medication, and the like.

The management system 130 may also establish charging needs for each of the pumps 110 (230). The charging needs of a particular pump can be established (e.g. determined) based on the current usage of the pump. For example, if one pump in the rack 120 is using more power to drive its motor (such as when dispensing medication), then the pump should be allocated a higher charge current so that the battery remains at a charge level high enough to continue powering the pump at a level that is necessary to dispense a medication to a patent. The charging needs can be established for one or more pumps in the rack 120 based on the parameter states, charging priority rate, and/or any other criteria as appropriate. For example, if a patient is receiving a critical medication from a first pump along with a noncritical IV solution from a second pump, the first pump delivering the critical therapy is allowed by the management system 130 to charge its battery faster. In a number of embodiments, the charging needs can include prioritizing and assigning fast charging versus trickle charging on a pump to pump basis based on the parameters. For example, rack power can be allocated to each pump such that each pump battery will be charged to a level that reduces risk to the patient from a depleted battery in the event that rack power has been removed.

The management system 130 may also establish charging profiles for the pumps 110 (240). Establishing a charging profile can include determining a set of commands for controlling the operating state (e.g. charge state) of one or more pumps in the rack 120. The commands can be transmitted to one or more of the pumps. Based on the commands, the pumps can automatically modify their power charging behavior based on the commands. In this way, the commands can be used to control the operation of the pumps in the rack (or any other multi-pump scenario).

Figure 3B:
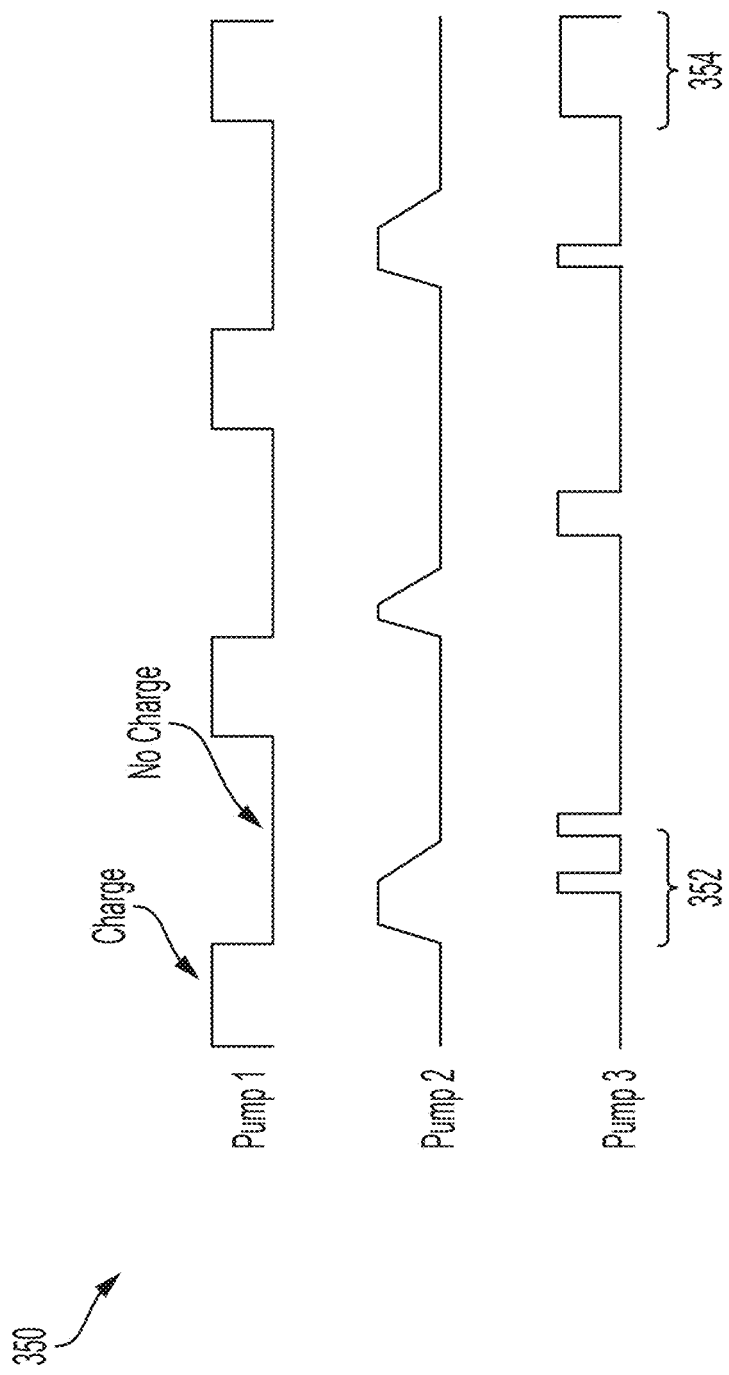

FIGS. 3A and 3B illustrate examples of charging profiles, according to example aspects of the present disclosure. It should be appreciated that in various other embodiments, the pumps 110 have other charging profiles and other numbers of charging needs. Furthermore, in various other embodiments, the multi-pump assembly may include different numbers of pumps, each having a charging profile.

FIG. 3A illustrates a charging profile 300 for a rack of pumps where only one pump in the rack is charging at a time. The charging profile 300 includes three pumps, where each pump is in a charge state at a different time. That is, when pump 1 is in a charge state, pumps 2 and 3 are in a no charge state. Similarly, when pump 2 is in a charge state, pumps 1 and 3 are in a no charge state and when pump 3 is in a charge state, pumps 1 and 2 are in a no charge state. Although the charging profile 300 includes pumps that are either in a charge state or not in a charge state, it should be noted that the frequency, slopes, and rate of charge can be modified as appropriate.

FIG. 3B illustrates a charging profile 350 for a rack of pumps where multiple pumps in the rack are charging at a time. The charging profile 350 shows various charging frequency, charge rate slopes, and parallel charging examples determined based on thermal and medication priority state. This can apply both to pumps that are next to each other and pumps that are separated by another pump. Parallel charging, or the charging of more than one pump at the same time, may occur both with pumps that are next to each other in the rack and pumps that are separated by at least one pump in the rack. For example, during time 352 in the charging profile 350, both pump 2 and pump 3 (adjacent pumps in the rack) are charging at the same time. Similarly, during time 354, both pump 1 and pump 3 (non-adjacent pumps in the rack) are charging at the same time.

Figure 4:
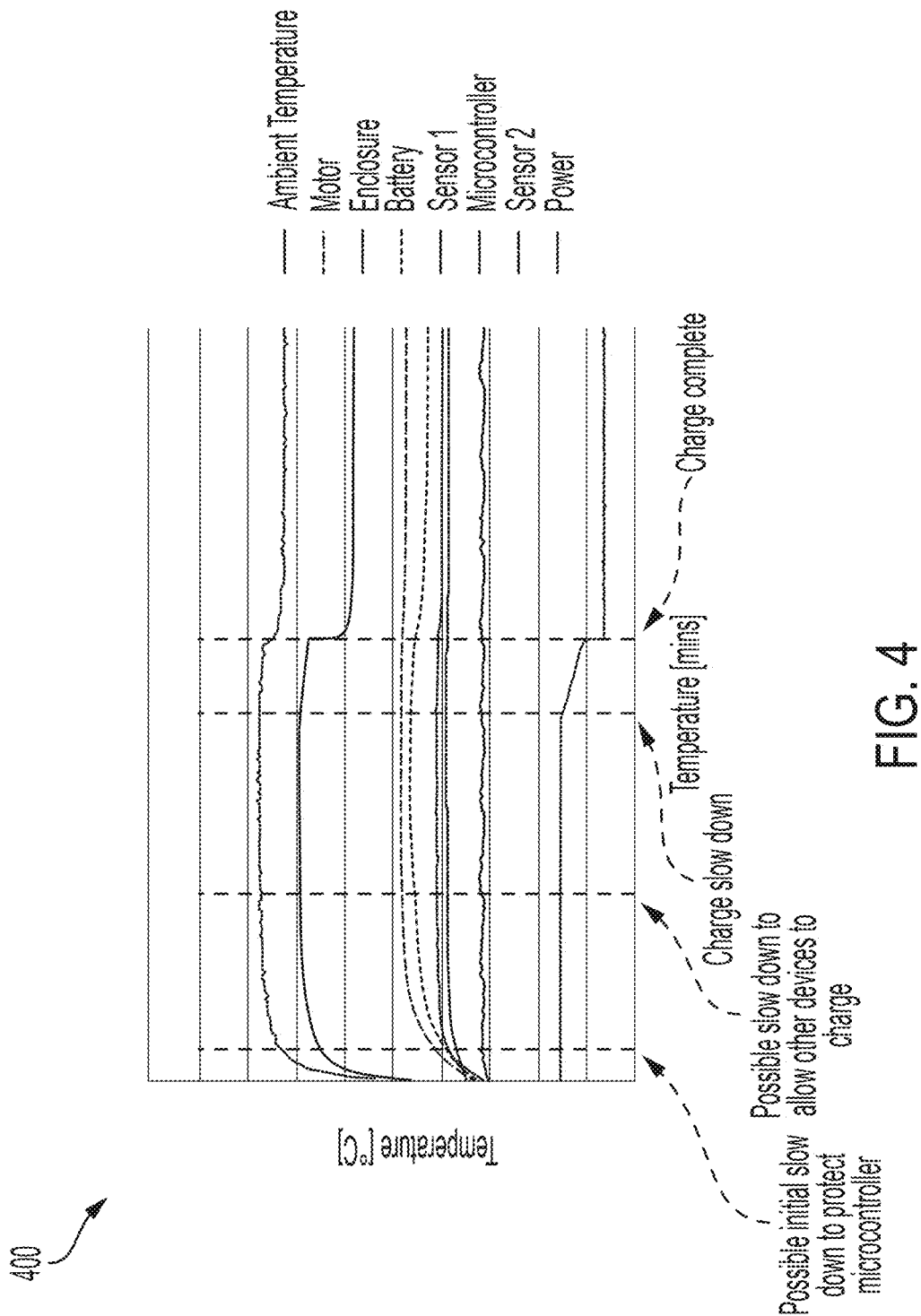
FIG. 4 illustrates an example of measured power and temperature during a charging cycle, according to an example aspect of the present disclosure.

FIG. 4 illustrates an example of monitored power and temperature during a charging cycle, according to an example aspect of the present disclosure. As shown in graph 400, a single pump is monitored. The pump is experiencing a reduced charging effect as the pump is experiencing system critical temperatures. For example, this can occur due to the density and power consumption of the pump within the rack 120, as described herein. A variety of temperatures can be improved by managing the charging cycles of the pump, as described herein, including motor temperatures, processor (and/or microcontroller) temperatures, enclosure temperatures, battery temperatures, IV tube temperatures, and the like. The graph 400 shows a variety of times where the charging cycle could be adjusted to improve thermal performance based on the measured temperature, such as slowing down the battery charging (as shown by the power line) to protect the processor (e.g. microcontroller) between time 0 and time 50 and slowing down the charging to allow other devices to charge between time 150 and time 200.

Each of the pumps can be controlled using charging profiles as described herein. By controlling the charging behavior of each pump using the charging profiles, the temperature of critical components of the pump can be managed as the charging rate of the device is adjusted. These components can include any of a variety of components and/or external devices (as monitored using sensors such as Sensor 1 and Sensor 2). In this way, the charging profile for each of the pumps can be used to control the thermal performance of the pumps individually and for multi-device system overall. For example, as the overall power consumption of a pump is reduced, the amount of heat exhausted by the pump will drop. Due to this temperature drop, the room air temperature also drops, which then allows the other pumps in the multi-device system to intake cooler air and improve their cooling performance as well.

It should be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Throughout this disclosure, terms like "advantageous", "exemplary" or "preferred" indicate elements or dimensions which are particularly suitable (but not essential) to the disclosure or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. An infusion pump system comprising:
    a first infusion pump;
    a second infusion pump; and
    a rack configured to mechanically couple to the first infusion pump and the second infusion pump, the rack including a management system that is communicatively coupled to the first infusion pump and the second infusion pump via a communication bus, the management system configured to:
        monitor a plurality of pump parameters for the first and second infusion pumps,
        determine charging needs for each infusion pump using the plurality of pump parameters,
        create a first charging profile for the first infusion pump and a different, second charging profile for the second infusion pump using the determined charging needs,
            the first charging profile specifying times that the first infusion pump is to enter a charge state and times the first infusion pump is to enter a no charge state, and
            the second charging profile specifying times that the second infusion pump is to enter a charge state and times the second infusion pump is to enter a no charge state, and
        transmit at least one command to each infusion pump that is indicative of the respective charging profile,
    wherein the first infusion pump is configured to charge according to the first charging profile and the second infusion pump is configured to charge according to the second charging profile.

2. The system of claim 1, wherein the pump parameters comprise at least one of:
    a criticality determination of a patient's medication;
    a battery charge state;
    a thermal state; or
    a power supply state.

3. The system of claim 1, wherein the management system is further configured to:

determine a pump schedule for the first and second infusion pumps using the plurality of pump parameters; and determine the charging needs for each infusion pump using the pump schedule.

4. The system of claim 3, wherein the management system is further configured to determine the first charging profile and the second charging profile such that the first infusion pump and the second infusion pump are charged at different times.

5. The system of claim 3, wherein the management system is further configured to determine the first charging profile and the second charging profile such that the first infusion pump and the second infusion pump are charged at overlapping times.

6. The system of claim 3, wherein the management system is further configured to determine the pump schedule based on pumping frequencies or infusion rates of the first infusion pump and the second infusion pump.

7. The system of claim 1, wherein the management system is further configured to:
use the first charging profile to determine transitions between the no charge state and the charge state for the first infusion pump; and
transmit the commands to cause the first infusion pump to change its charge state based on the determined transitions.

8. The system of claim 7, wherein the management system is further configured to:
use the second charging profile to determine transitions between the no charge state and the charge state for the second infusion pump; and
transmit the commands to cause the second infusion pump to change its charge state based on the determined transitions.

9. The system of claim 1, wherein the management system receives the plurality of pump parameters at a first time and receives a second plurality of pump parameters at a second, subsequent time, and
wherein the management system is configured to:
determine a change in the pump parameters based on a difference between the plurality of pump parameters received at the first time and the second the plurality of pump parameters received at the second time,
determine new charging needs for each infusion pump,
create a new first charging profile for the first infusion pump and a different, new second charging profile for the second infusion pump, and
transmit at least one new command to each infusion pump that is indicative of the respective new charging profile.

10. The system of claim 1, further comprising a third infusion pump mechanically coupled to the rack and communicatively coupled to the management system,
wherein the management system is further configured to:
monitor the plurality of pump parameters additionally for the third infusion pump,
determine charging needs additionally for the third infusion pump,
create a third charging profile for the third infusion pump using the determined charging needs, and
transmit at least one command to the third infusion pump that is indicative of the third charging profile.

11. The system of claim 1, wherein the first infusion pump is at least one of a large volume pump, a syringe pump, a patient-controlled analgesia pump, or a nutrition pump, and
wherein the second infusion pump is at least one of a large volume pump, a syringe pump, a patient-controlled analgesia pump, or a nutrition pump.

12. The system of claim 1, wherein the management system is further configured to transmit a request message to the first and second infusion pumps to receive the plurality of pump parameters.

13. The system of claim 1, wherein the management system is communicatively coupled to the first infusion pump and the second infusion pump via at least one of a serial connection, a controller area network ("CAN") connection, an Ethernet connection, or a universal serial bus ("USB") connection.

14. A computer-implemented method for managing power and charging rates in a multi-pump assembly, the method comprising:
monitoring a plurality of pump parameters for a plurality of infusion pumps;
determining a change in the pump parameters;
determining charging needs for each infusion pump in the plurality of infusion pumps using the plurality of pump parameters and the determined change in the pump parameters;
determining a charging profile for each infusion pump in the plurality of infusion pumps,
a first charging profile specifying times that a first infusion pump of the plurality of infusion pumps is to enter a charge state and times the first infusion pump is to enter a no charge state, and
a second charging profile specifying times that a second infusion pump of the plurality of infusion pumps is to enter a charge state and times the second infusion pump is to enter a no charge state; and
transmitting a command to each infusion pump that is indicative of the respective charging profile.

15. The computer-implemented method of claim 14, wherein the pump parameters comprise at least a criticality determination of a patient's medication.

16. The computer-implemented method of claim 14, wherein the pump parameters comprise at least a battery charge state.

17. The computer-implemented method of claim 14, wherein the pump parameters comprise at least a pump schedule.

18. The computer-implemented method of claim 14, wherein the pump parameters comprise at least a thermal state.

19. The computer-implemented method of claim 14, wherein the pump parameters comprise at least a power supply state.

* * * * *